(12) United States Patent
Steele et al.

(10) Patent No.: US 7,270,735 B2
(45) Date of Patent: Sep. 18, 2007

(54) SYSTEM AND METHOD FOR HOLDING AND RELEASING A WORKPIECE FOR ELECTROCHEMICAL MACHINING

(75) Inventors: Mark Greg Steele, Scotts Valley, CA (US); Dustin Alan Cochran, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 507 days.

(21) Appl. No.: 10/743,935

(22) Filed: Dec. 22, 2003

(65) Prior Publication Data

US 2004/0140224 A1   Jul. 22, 2004

Related U.S. Application Data

(60) Provisional application No. 60/441,682, filed on Jan. 21, 2003.

(51) Int. Cl.
*C25D 17/10* (2006.01)
*B23H 3/00* (2006.01)
*B25B 11/00* (2006.01)

(52) U.S. Cl. ............... 205/652; 204/224 M; 204/242; 204/297.03; 269/21

(58) Field of Classification Search .............. 204/242, 204/297.03, 280; 269/21
See application file for complete search history.

(56) References Cited

U.S. PATENT DOCUMENTS

| | | | |
|---|---|---|---|
| 4,051,010 A | 9/1977 | Roth et al. ................ 204/298 |
| 4,410,168 A | 10/1983 | Gotman | |
| 4,752,025 A | 6/1988 | Stach et al. ................ 228/9 |
| 4,818,838 A | 4/1989 | Young et al. ........... 219/121.12 |
| 4,972,990 A | 11/1990 | Abbagnaro et al. ........... 228/20 |
| 5,173,338 A | 12/1992 | Sharp et al. ............... 427/287 |
| 5,474,958 A | 12/1995 | Djennas et al. ............. 437/211 |
| 5,556,327 A * | 9/1996 | Jenkins et al. ............. 451/278 |
| 5,870,271 A * | 2/1999 | Herchen .................... 361/234 |
| 6,084,666 A * | 7/2000 | Kindwall et al. ........... 356/244 |
| 6,264,185 B1 | 7/2001 | Isobe et al. | |
| 6,320,661 B1 * | 11/2001 | Yoshida et al. ............. 356/432 |
| 6,416,647 B1 * | 7/2002 | Dordi et al. ................ 205/137 |
| 6,743,349 B2 * | 6/2004 | Mori et al. ................. 205/652 |

FOREIGN PATENT DOCUMENTS

DE     29518188     1/1996

* cited by examiner

*Primary Examiner*—Roy King
*Assistant Examiner*—Nicholas A. Smith
(74) *Attorney, Agent, or Firm*—Darby & Darby

(57) ABSTRACT

A system and method are described for holding and releasing a workpiece for electrochemical machining. In one embodiment, a workpiece holder has a workpiece surface that couples to the workpiece when negative pressure is applied to provide a seal between the workpiece and the workpiece surface. A plenum located within the workpiece holder has a proximal end capable of being removably coupled to the workpiece. A piston is configured to move upward in the plenum and to lift the workpiece off of the workpiece surface in response to positive pressure being applied.

15 Claims, 5 Drawing Sheets

… (1) …

SYSTEM AND METHOD FOR HOLDING AND RELEASING A WORKPIECE FOR ELECTROCHEMICAL MACHINING

CROSS-REFERENCE TO RELATED APPLICATION

This application relates to, and claims the priority benefit of, U.S. Provisional Patent Application No. 60/441,682, titled "Vacuum Type Workholder for ECM," filed Jan. 21, 2003. The subject matter of this related application is hereby incorporated by reference.

This application also is related to U.S. Pat. No. 7,144,482, titled "Critical Orifice Gap Setting for ECM Grooving of Flat Plates," filed Jun. 30, 2003. The subject matter of this related application also is hereby incorporated by reference.

BACKGROUND OF THE INVENTION

1. Field of the Invention

This invention relates generally to electrochemical machining and more specifically to a system and method for holding and releasing a workpiece for electrochemical machining.

2. Description of the Background Art

As set forth in the related application, a very small and consistent machining gap must be maintained between a workpiece and an electrode to electrochemically machine grooves into the workpiece effectively. In fact, the accuracy and consistency of the machining gap are oftentimes the most important factors in controlling the width and depth as well as the variability of electrochemically machined grooves. For example, in certain applications, the machining gap must be 20 microns or less and must not vary by more than 2 to 3 microns over the entire machining area for proper electrochemical machining of the grooves.

Current workpiece holders normally use mechanical clamps or some other mechanical means to secure the workpiece during electrochemical machining. One drawback to using these types of workpiece holders is that they tend to be too large and/or cumbersome to use where the machining gaps are 20 microns or smaller. Another drawback is that these types of workpiece holders create too much variability in the machining gap over the machining area (i.e., they cause the machining gap to vary by more than 3 microns over the machining area). Yet another drawback is that the mechanical clamps or other mechanical means used by current workpiece holders usually couple to the face of the workpiece that is being machined, thereby decreasing the amount of workpiece surface area available for machining.

SUMMARY OF THE INVENTION

One embodiment of a system for holding and releasing a workpiece for electrochemical machining includes a workpiece holder having a workpiece surface. The workpiece surface is configured to couple to the workpiece in response to negative pressure being applied to the system to provide a seal between the workpiece and the workpiece surface. The system also includes a plenum located within the workpiece holder. The plenum has a proximal end capable of being removably coupled to the workpiece. In addition, the system includes a piston, which is configured to move upward in the plenum towards the workpiece in response to positive pressure being applied to the system. The piston is further configured and lift the workpiece off of the workpiece surface once the piston engages the workpiece.

One advantage of the disclosed system is that it can be manufactured to create a high degree of parallelism (on the order of one micron) between the workpiece surface and a locating surface of the base of the system. Such parallelism allows for more accurate and consistent machining gaps. For example, machining gaps on the order of 10 microns with a gap variability of less than 3 microns over the face of the workpiece can be achieved with this system. Another advantage is that the disclosed system uses a vacuum force instead of some sort of mechanical clamp to hold the workpiece against the workpiece surface. Such an approach not only enables the disclosed system to be used with smaller machining gaps but also increases the amount of workpiece surface area available for machining.

DETAILED DESCRIPTION OF THE INVENTION

Figure 1:
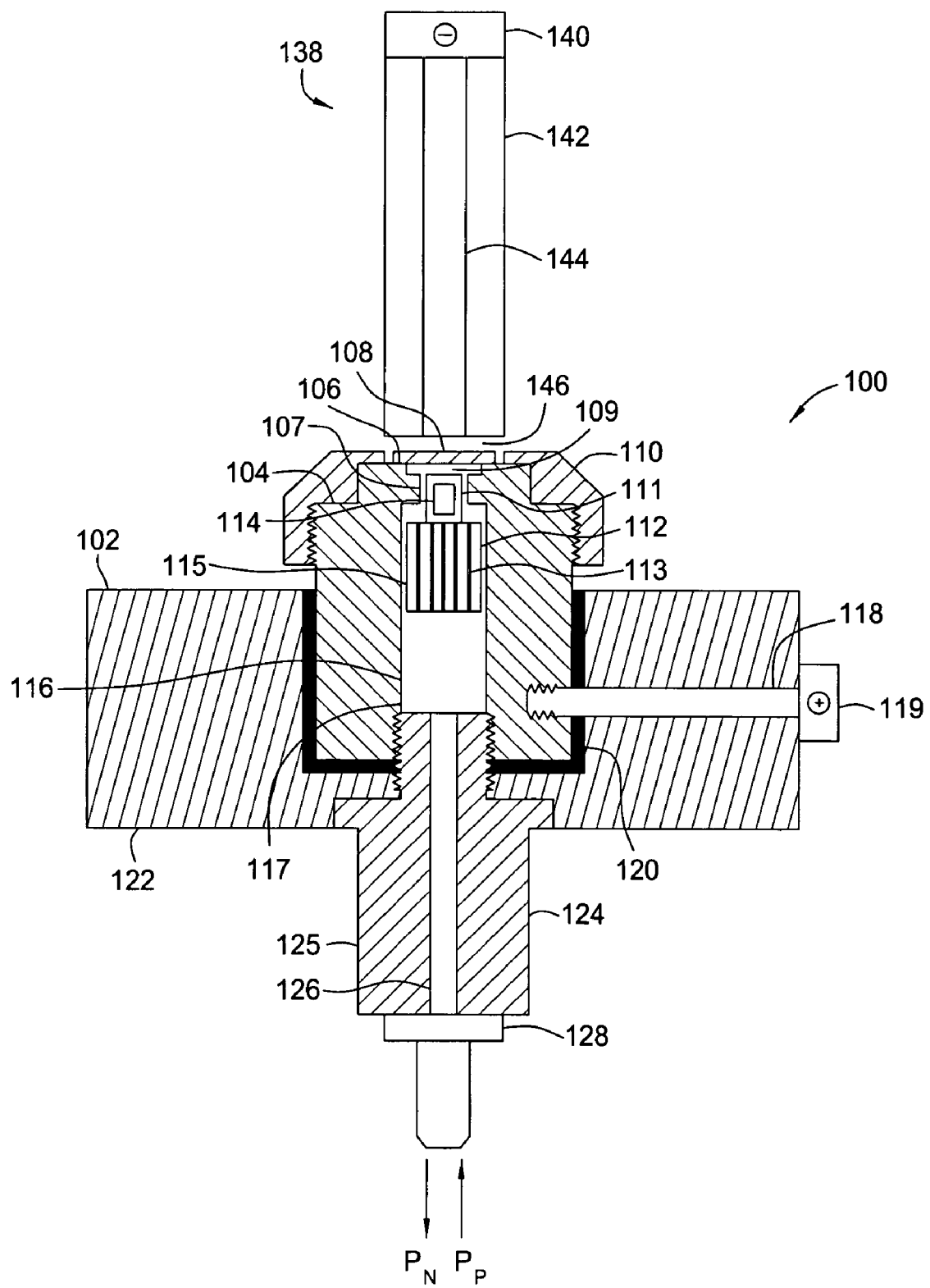
FIG. 1 is a cross-sectional view illustrating a system for holding and releasing a workpiece for electrochemical machining, according to one embodiment of the invention.

FIG. 1 is a cross-sectional view illustrating a system 100 for holding and releasing a workpiece 108 for electrochemical machining, according to one embodiment of the invention. As shown, system 100 includes, without limitation, a base 102, a workpiece support 104, a radial locator 110, a piston 112, a plenum 116, an electrical connector 118, an insulation layer 120, a horizontal locating piece 124, a vacuum port 126 and a vacuum connector 128. Base 102 is the overall support for system 100 and includes a locating surface 122, which vertically positions system 100 with respect to the hydrostatic bearing cartridge assembly described in the related application. In one embodiment, base 102 comprises a ferritic stainless steel such as 430 stainless steel. In other embodiments, base 102 may comprise other materials having similar magnetic properties. Persons skilled in the art will recognize, however, that the scope of the invention is in no way limited by the material composition of base 102.

Workpiece support 104 is primarily responsible for supporting workpiece 108 during the electrochemical machining ("ECM") process. As shown, workpiece support 104 includes a workpiece surface 106 that provides an extremely flat and very smooth surface against which workpiece 108 is coupled during the ECM process. Workpiece support 104 is attached to base 102 such that workpiece support 104 and base 102 may be machined as one assembly to create a very high degree of parallelism between workpiece surface 106 and locating surface 122. For example, in one embodiment, base 102 and attached workpiece support 104 are magnetically coupled to a grinding table. Workpiece support 104 is then finely ground to make workpiece surface 106 extremely flat and very smooth and to achieve a very high degree of parallelism between workpiece surface 106 and locating surface 122. In one embodiment, the parallelism between workpiece surface 106 and locating surface 122 is on the order of one micron.

In one embodiment, workpiece support 104 comprises titanium such that workpiece support 104 is resistant to anodic corrosion. In an alternative embodiment, workpiece support 104 may be coated with titanium. In yet other embodiments, workpiece support 104 may comprise or may be coated with other conductive materials that demonstrate similar resistance to anodic corrosion.

Workpiece support 104 is configured with a machined interior to form plenum 116, which receives the positive or negative pressure applied by an external pressure system (not shown) and provides a space within which piston 112 can move up and down as the external pressure system applies negative or positive pressure to system 100. In one embodiment, the external pressure system includes a venturi vacuum. As shown, plenum 116 has a smaller diameter at a proximal end 107 and a larger diameter at a distal end 117 to accommodate the shape of piston 112. In one embodiment, proximal end 107 includes a vacuum reservoir 109. As described in further detail below in conjunction with FIG. 2A, vacuum reservoir 109 has the primary purpose of increasing the area of workpiece 108 exposed to the negative pressure applied by the external pressure system, thereby increasing the chucking force exerted on workpiece 108 during the ECM process.

As shown, piston 112 includes a base portion 115 and an ejector pin 111. Base portion 115 includes any number of air passages 113, which, as described in further detail herein, provide a flow path between vacuum reservoir 109 and vacuum port 126 that enables the pressure in vacuum reservoir 109 to drop when the external pressure system applies a negative pressure, $P_N$, to system 100. This pressure drop produces the chucking force that clamps workpiece 108 to workpiece surface 106. As described in further detail below in conjunction with FIG. 2B, ejector pin 111 is configured to lift workpiece 108 off of workpiece surface 106 in response to the external pressure system applying a positive pressure, $P_P$, on piston 112 during the dechucking process, which occurs after the ECM process terminates. Piston 112 also includes a magnet 114, which is located within ejector pin 111. As described is further detail herein, magnet 114 couples workpiece 108 to ejector pin 111 as ejector pin 111 lifts workpiece 108 off of workpiece surface 106. This coupling prevents workpiece 108 from flying off of (or launching from) workpiece surface 106 when ejector pin 111 lifts workpiece 108 off of workpiece surface 106.

Radial locator 110 is responsible for radially locating workpiece 108 with respect to the hydrostatic bearing cartridge assembly described in the related application. As persons skilled in the art will recognize, Radial locator 110 may be sized with varying inner diameters to accommodate workpieces 108 of different sizes. Radial locator 110 is configured to removably attach to workpiece holder 104. Radial locator 110 is further configured such that workpiece surface 106 is exposed when radial locator 110 is attached to workpiece holder 104. Such a configuration enables workpiece 108 to be loaded into system 100 by inserting workpiece 108 into the area defined by the inner diameter of radial locator 110 such that workpiece 108 lies flat against workpiece surface 106. In one embodiment, radial locator 110 and workpiece support 104 are both threaded such that radial locator 110 screws onto and off of workpiece support 104.

Electrical connector 118 connects to workpiece support 104 to provide an electrical path between workpiece 108 and an anodic electrical source 119 such that workpiece 108 may act as an anode for the ECM process when coupled to workpiece surface 106, as described in the related application. Insulation layer 120 electrically isolates workpiece support 104 and workpiece 108 from the rest of the ECM tool of which system 100 is part.

Horizontal locating piece 124, which includes a locating surface 125, is primarily responsible for horizontally positioning system 100 with respect to the hydrostatic bearing cartridge assembly described in the related application. Horizontal locating piece 124 also is configured with a machined interior to form vacuum port 126, which runs the entire length of horizontal locating piece 124 and couples plenum 116 to the external pressure system. Vacuum connector 128, which is attached to a distal end of horizontal locating piece 124, couples vacuum port 126 to the external pressure system. In one embodiment, base 102, workpiece holder 104 and horizontal locating piece 124 are threaded such that horizontal locating piece 124 screws into and out of base 102 and attached workpiece support 104.

Also shown in FIG. 1 is an electrode assembly 138, which, as described in further detail in the related application, provides the other half of the circuit necessary for the ECM process. An electrode 142 is configured to provide the pattern machined into workpiece 108 using the ECM process and to act as a cathode for the ECM process. Electrolyte path 144 is disposed within electrode 142 and provides the conductive electrolyte used in the ECM process. Cathodic electrical source 140 is coupled to electrode 142 and provides the current necessary for the ECM process. Electrode assembly 138 is separated from workpiece 108 by a machining gap 146.

In one embodiment, the process of holding workpiece 108 against workpiece surface 106 begins by selecting an appropriately sized radial locator 110 and attaching it to workpiece holder 104. The selection of radial locator 110 is based on the size of workpiece 108. The external pressure system then applies a negative pressure, $P_N$, to system 100 via vacuum port 126. Air passages 113 in piston 112 are configured to enable air to flow from vacuum reservoir 109, through distal end 117 of plenum 116, to vacuum port 126. Workpiece 108 is then loaded into system 100 such that workpiece 108 lies flat against workpiece surface 106, within the space defined by the inner diameter of radial locator 110.

As described in further detail below in conjunction with FIG. 2A, if the flow rate generated by the external pressure system is sufficiently high, a seal forms between workpiece 108 and workpiece surface 106 when workpiece 108 is loaded onto workpiece surface 106. Once this seal forms, the pressure in vacuum reservoir 109 drops to $P_N$, the pressure that the external pressure system is applying to system 100. The pressure drop in vacuum reservoir 109 results in a pressure drop across workpiece 108 that produces a net force (i.e., a chucking force) acting downward on workpiece 108. This chucking force secures workpiece 108 against workpiece surface 106 without using any type of mechanical clamp and enables the entire surface area of the top face of workpiece 108 to be machined using the ECM process. In one embodiment, the pressure drop across workpiece 108 is equal to the difference between the atmospheric pressure, which is the pressure acting on the top face of workpiece 108, and negative pressure, $P_N$, which is the pressure acting on the bottom face of workpiece 108 (i.e., the face of workpiece of workpiece 108 adjacent to vacuum reservoir 109).

In one embodiment, the process of dechucking workpiece 108 from workpiece surface 106 begins with the external pressure system switching from applying a negative pressure, $P_N$, to system 100 to applying a positive pressure, $P_P$, to system 100. The external pressure system first stops applying negative pressure, $P_N$, to system 100. As persons skilled in the art will understand, system 100 may be configured such that turning off the negative pressure flow causes the pressure in vacuum reservoir 109 to return to the level that existed just prior to turning on the negative pressure flow. In one embodiment, the external pressure system includes a venturi vacuum, so the pressure in vacuum reservoir 109 returns to atmospheric pressure when the negative pressure flow is turned off. The result of the pressure in vacuum reservoir 109 returning to the level that existed just prior to turning on the negative pressure flow is that the pressure drop across workpiece 108 and, hence, the chucking force on workpiece 108 disappear.

The external pressure system then applies positive pressure, $P_P$, to system 100. As described in further detail below in conjunction with FIG. 2B, if the flow rate generated by the external pressure system is sufficiently high, a net upward force that acts on piston 112 is produced that causes piston 112 to move in an upward direction within plenum 116. As piston 112 moves upward towards workpiece 108, ejector pin 111 engages workpiece 108 and lifts workpiece 108 off of workpiece surface 106. Magnet 114 couples workpiece 108 to ejector pin 111 to prevent workpiece 108 from flying off of (or launching from) ejector pin 111 when ejector pin 111 lifts workpiece 108 off of workpiece surface 106. Once lifted, workpiece 108 may be decoupled from ejector pin 111 and removed from system 100 for further processing or disposition.

Figure 2A:
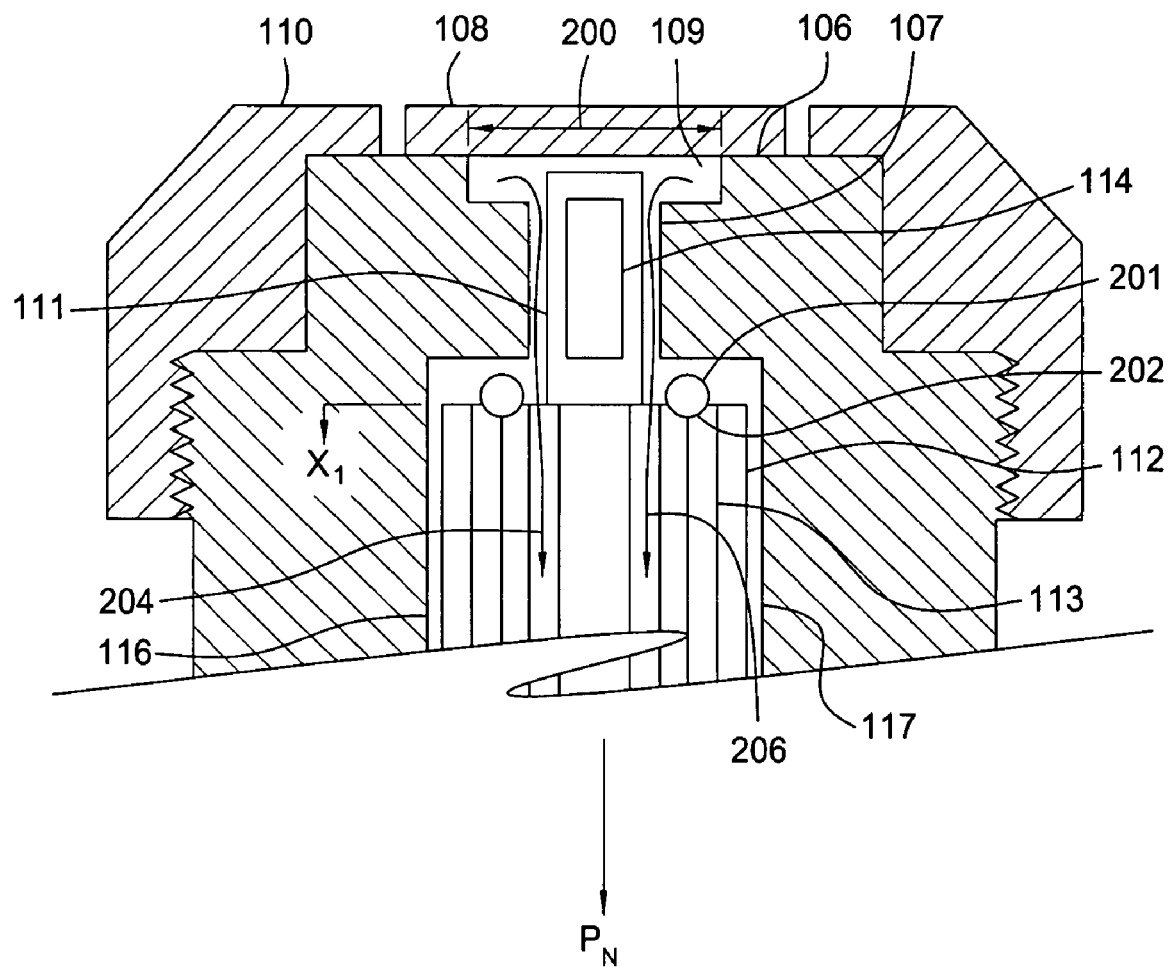
FIG. 2A is a cross-sectional view illustrating the configuration of the workpiece, the workpiece surface and the piston of FIG. 1 when holding the workpiece against the workpiece surface, according to one embodiment of the invention.

FIG. 2A is a cross-sectional view illustrating the configuration of workpiece 108, workpiece surface 106 and piston 112 of FIG. 1 when holding workpiece 108 against workpiece surface 106, according to one embodiment of the invention. As shown, when the external pressure system applies the negative pressure, $P_N$, to system 100, air flows from vacuum reservoir 109, through air passages 113 and distal end 117 of plenum 116, to vacuum port 126 (not shown) along exemplary air paths 204 and 206. Piston 112 also moves downward within plenum 116, represented by $x_1$.

In one embodiment, both workpiece surface 106 and workpiece 108 are ground such that each is extremely flat and very smooth. For example, the roughness average, $R_A$, of the finish on both workpiece surface 106 and workpiece 108 may be on the order of 0.05 to 0.1 microns. As persons skilled in the art will recognize, a mating surface between two extremely flat and very smooth surfaces can form a very effective seal in pressurized environments. For this reason, if the external pressure system generates a sufficiently high flow rate, an effective seal forms across the areas where workpiece 108 contacts workpiece surface 106 that prevents air from leaking into vacuum reservoir 109 when workpiece 108 is loaded into system 100. The formation of this seal causes the pressure in vacuum reservoir 109 to drop to $P_N$, the pressure that the external pressure system is applying to system 100. The resulting pressure drop across workpiece 108 produces a net chucking force that acts downward on workpiece 108 and secures workpiece 108 against workpiece surface 106 such that the ECM process may be run on workpiece 108. As persons skilled in the art will recognize, the magnitude of the chucking force is a function of an area 200 of workpiece 108 over which the pressure in vacuum reservoir 109 is acting against workpiece 108 and the pressure drop across workpiece 108. Further, the chucking force persists so long as the external pressure source continues to apply negative pressure, $P_N$, to system 100. In one embodiment, the pressure drop equals the difference between the atmospheric pressure and negative pressure, $P_N$.

Figure 2B:
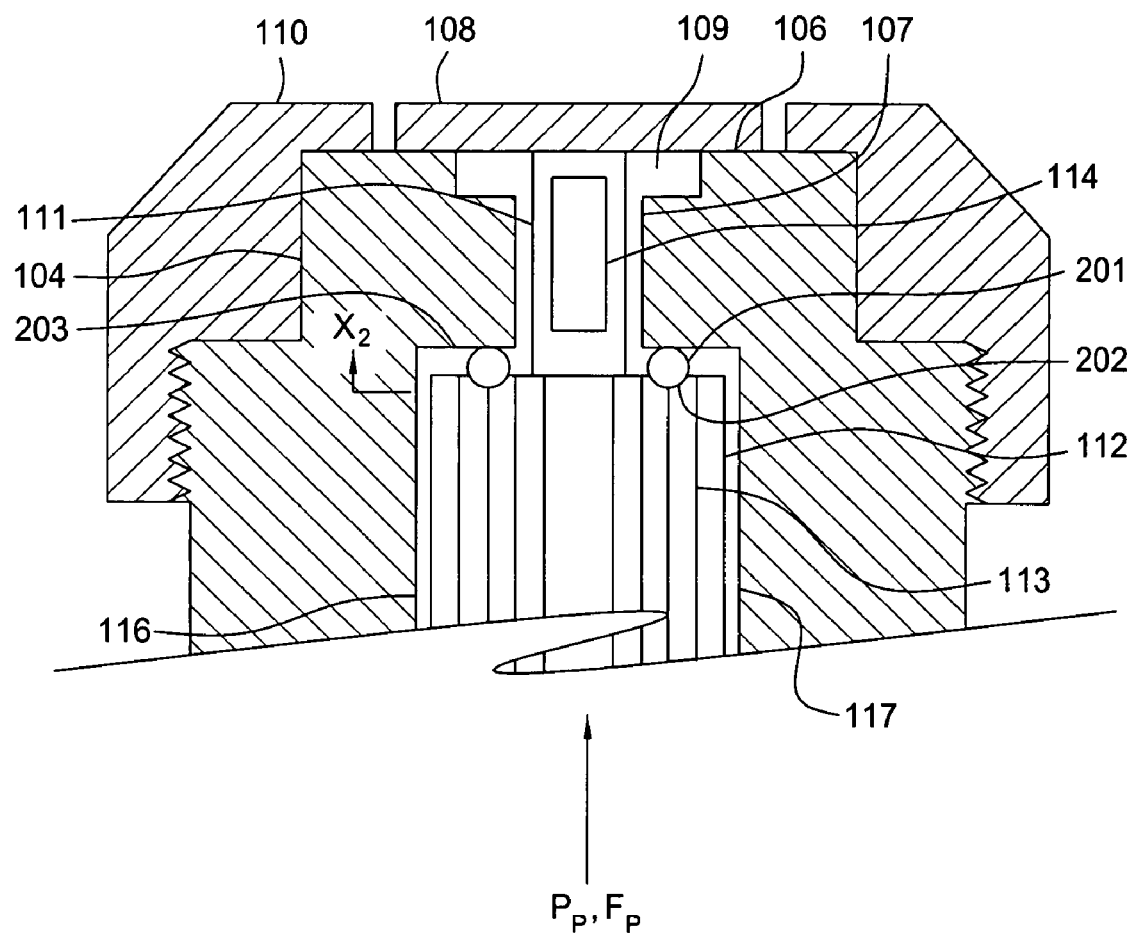
FIG. 2B is a cross-sectional view illustrating the configuration of the workpiece, the workpiece surface and the piston of FIG. 1 when releasing the workpiece from the workpiece surface, according to one embodiment of the invention.

FIG. 2B is a cross-sectional view illustrating the configuration of workpiece 108, workpiece surface 106 and piston 112 of FIG. 1 when releasing workpiece 108 from workpiece surface 106, according to one embodiment of the invention. As shown, piston 112 includes an O-ring groove 202 located on the top face of base portion 115 in which an O-ring 201 is affixed. As described in further detail below in conjunction with FIG. 3, O-ring groove 202 is configured such that a seal forms between O-ring 201 and a containment surface 203 of workpiece holder 204 when O-ring 201 engages containment surface 203. This seal prevents air from flowing through air passages 113 (or around piston 112) into vacuum reservoir 109 when the external pressure system applies positive pressure, $P_P$, to system 100.

As also shown, if the flow rate generated by the external pressure system when applying positive pressure, $P_P$, to system 100 is sufficiently high, a net resulting force, $F_P$, is produced that pushes piston 112 upward within plenum 116 towards workpiece 108. The upward movement of piston 112 within plenum 116 is represented by $X_2$ in FIG. 2B. In one embodiment, the external pressure system, piston 112 and plenum 116 are configured such that net resulting force, $F_P$, pushes piston 112 upward within plenum 116 fast enough to permit only a diminimous amount of air to flow around piston 112 or through air passages 113 into vacuum reservoir 109 prior to when O-ring 201 engages containment surface 203. Once O-ring 201 engages containment surface 203, O-ring 201 prevents air from flowing into vacuum reservoir 109. Among other things, restricting the air flow to vacuum reservoir 109 prevents the air pushed into plenum 116 by the external pressure system from prematurely lifting workpiece 108 off of workpiece surface 106.

As net resulting force, $F_P$, continues to push piston 112 upward, O-ring 201 compresses against containment surface 203. The compression allows piston 112 to continue moving upward in plenum 116 such that ejector pin 111 is able to engage workpiece 108 and lift workpiece 108 off of workpiece surface 106. Magnet 114 couples workpiece 108 to ejector pin 111 such that workpiece 108 does not fly off (or launch from) workpiece surface 106 when ejector pin 111 lifts workpiece 108 off of workpiece surface 106. In one embodiment, ejector pin 111 lifts workpiece 108 approximately 1 mm off of workpiece surface 106. Persons skilled in the art will recognize that once piston 112 comes to rest against restraining surface 203, piston 112 remains suspended within plenum 116 so long as the external pressure system continues to apply positive pressure, $P_P$, to system 100 since net resulting force, $F_P$, is a function of the pressure differential across piston 112.

Figure 3:
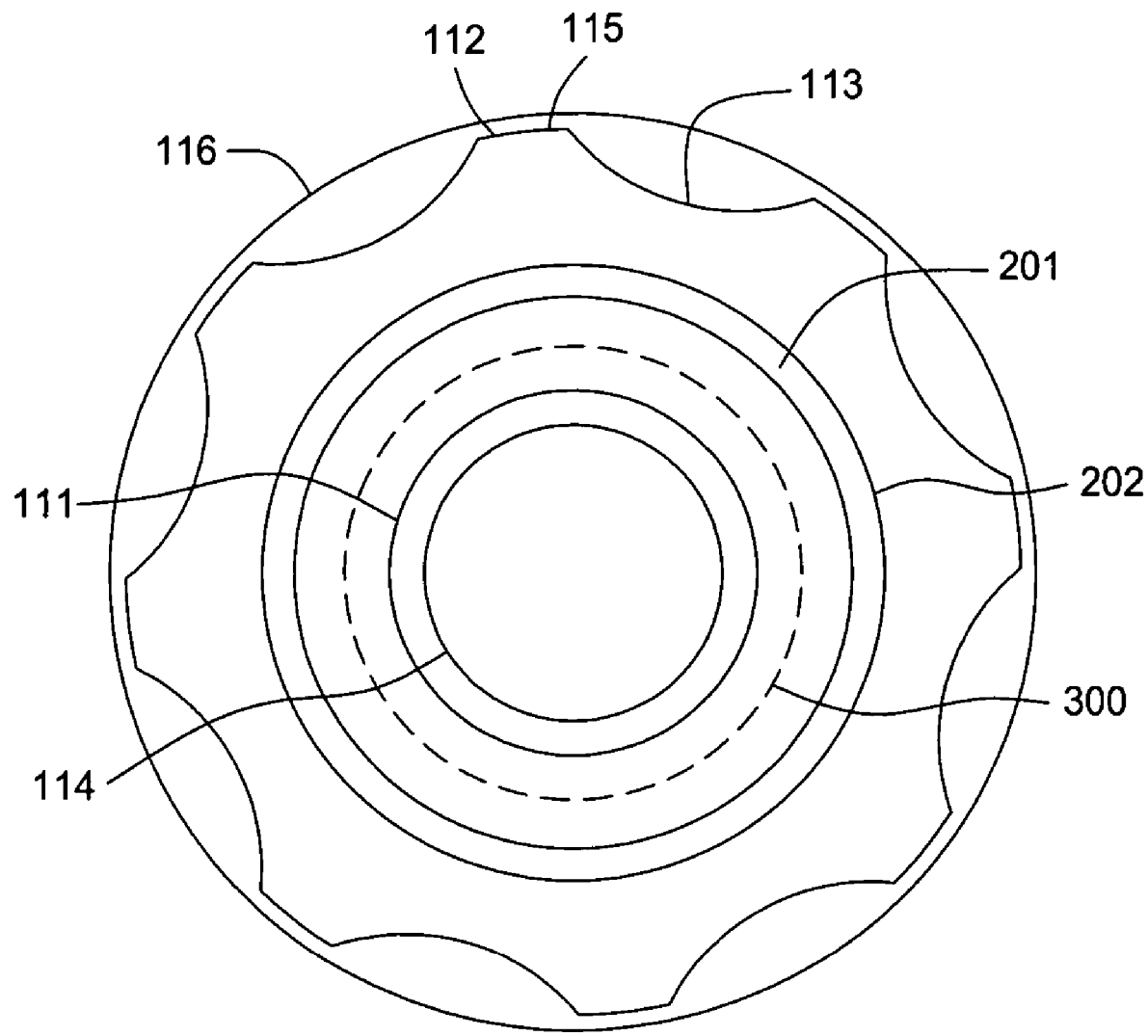
FIG. 3 is a cross-sectional top view of the piston illustrating the configuration of the air passages, the O-ring groove, the O-ring and the ejector pin of FIG. 2B, according to one embodiment of the invention.

FIG. 3 is a cross-sectional top view of piston 112 illustrating the configuration of air passages 113, O-ring groove 202, O-ring 201 and ejector pin 111 of FIG. 2B, according to one embodiment of the invention. As shown, piston 112 sits within plenum 116 such that piston 112 may move downward and upward within plenum 116 as the external pressure system applies negative and positive pressure, respectively, to system 100. Air passages 113 are located about the outer periphery of base portion 115 of piston 112 and span the entire height (i.e., from top to bottom) of base portion 115.

Projection line 300 represents the location of proximal end 107 of plenum 116 relative to the top surface of base portion 115. As also shown, O-ring groove 202 is disposed on the top surface of base portion 115. In addition, O-ring groove 202 is configured to have a circular geometry and to be concentric to the outer periphery of base portion 115. O-ring groove 202 is further configured to have a diameter that is small enough such that O-ring groove 202 is disposed on the inside of air passages 113 relative to the center of the top surface of base portion 115, but large enough such that O-ring groove 202 is disposed on the outside of projection line 300 relative to the center of the top surface of base portion 115. O-ring 201, which is affixed to O-ring groove 202, is disposed on the inside of air passages 113, but on the outside of projection line 300 as well.

Persons skilled in the art will understand that in this configuration, O-ring 201 creates a seal between air passages 113 and proximal end 107 of plenum 116 when O-ring 201 engages restraining surface 203 as described above in conjunction with FIG. 2B. Such a seal, among other things, prevents air from flowing from air passages 113 (or around piston 112), through proximal end 107 of plenum 116, into vacuum reservoir 109 when the external pressure system applies positive pressure, $P_P$, to system 100 as described herein.

Figure 4:
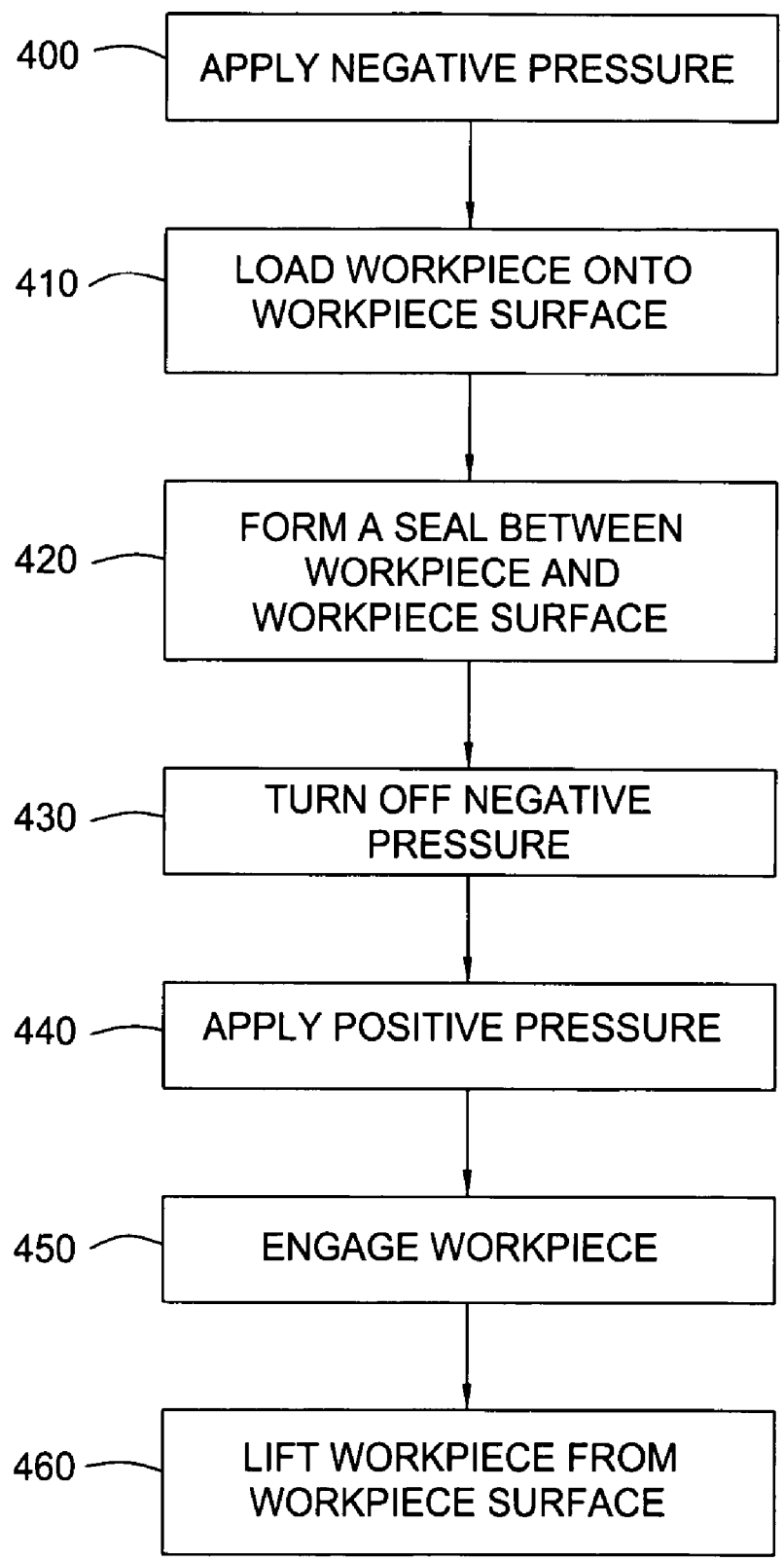
FIG. 4 is a flow chart of method steps for holding and releasing a workpiece for electrochemical machining, according to one embodiment of the invention.

FIG. 4 is a flow chart of method steps for holding and releasing a workpiece for electrochemical machining, according to one embodiment of the invention. Although the method steps are described in the context of the systems illustrated in FIGS. 1-3, any system configured to perform the method steps in any order is within the scope of the invention.

As shown in FIG. 4, the method of holding and releasing a workpiece starts in step 400 where negative pressure is applied to system 100. In one embodiment, an external pressure system that includes a venturi vacuum applies negative pressure to system 100 via vacuum port 126. Further, distal end 117 of plenum 116 is coupled to vacuum port 126 such that the air flows from proximal end 107 of plenum 116, through distal end 117, to vacuum port 126 when the negative pressure is applied to system 100.

In step 410, workpiece 108 is loaded onto workpiece surface 106. In one embodiment, workpiece 108 is inserted into the area defined by the inner diameter of radial locator 110 such that workpiece 108 lies flat against workpiece surface 106. Radial locator 110 radially locates workpiece 108 with respect to the hydrostatic bearing cartridge assembly described in the related application. Radial locator 110 may be sized with varying inner diameters to accommodate workpieces 108 of different sizes.

In step 420, a seal is formed between workpiece 108 and workpiece surface 106. In one embodiment, both workpiece surface 106 and workpiece 108 are ground to be extremely flat and very smooth and the flow rate through plenum 116 produced by the external pressure system is great enough such that an effective seal forms across the areas where workpiece 108 contacts workpiece surface 106 when workpiece 108 is loaded into system 100. This seal prevents air from leaking across workpiece 108 into vacuum reservoir 109 and causes the pressure in vacuum reservoir 109 to drop to the level of the negative pressure applied to system 100. The resulting pressure drop across workpiece 108 produces a net chucking force that acts downward on workpiece 108 and secures workpiece 108 against workpiece surface 106 such that the ECM process may be run on workpiece 108. The magnitude of the chucking force is a function of area 200 of workpiece 108 over which the pressure in vacuum reservoir 109 acts against workpiece 108 and the pressure drop across workpiece 108. In one embodiment, the pressure drop equals the difference between the atmospheric pressure and the level of the negative pressure applied to system 100. Further, the chucking force persists so long as the external pressure source continues to apply the negative pressure to system 100.

In step 430, the negative pressure applied to system 100 is turned off. In one embodiment, turning off the negative pressure flow causes the pressure in proximal end 107 of plenum 116 to return to the level that existed just prior to turning on the negative pressure flow. The result is that the pressure drop across workpiece 108 and, hence, the chucking force acting on workpiece 108 disappears.

In step 440, positive pressure is applied to system 100. In one embodiment, an external pressure system that includes a venturi vacuum applies the positive pressure to system 100. Further, if the flow rate generated by the external pressure system is sufficiently high, a net resulting force is produced in response to the positive pressure that pushes piston 112 upward within plenum 116 towards workpiece 108 fast enough to permit only a diminimous amount of air to flow around piston 112 or through air passages 113 into proximal end 107 of plenum 116 before O-ring 201 engages containment surface 203. When O-ring 201 engages containment surface 203, O-ring 201 forms a seal against containment surface 203 that prevents air from flowing into proximal end 107 of plenum 116.

In step 450, piston 112 engages workpiece 108. As the net resulting force continues to push piston 112 upward after O-ring 201 engages containment surface 203, O-ring 201 compresses against containment surface 203. In one embodiment, the compression allows piston 112 to continue moving upward in plenum 116 such that ejector pin 111 is able to engage workpiece 108. In addition, magnet 114 couples workpiece 108 to ejector pin 111 such that workpiece 108 does not fly off (or launch from) workpiece surface 106 when ejector pin 111 engages workpiece 108.

In step 460, piston 112 lifts workpiece 108 off of workpiece surface 106. In one embodiment, O-ring 201 compresses against containment surface 203 enough such that ejector pin 111 is able to lift workpiece 108 approximately 1 mm off of workpiece surface 106.

One advantage of the system and method described above is that, among other things, system 100 can be manufactured to create a high degree of parallelism (on the order of one micron) between workpiece surface 106 and locating surface 122 of base 102. Such parallelism allows for a more accurate and consistent machining gap 146. For example, machining gaps on the order of 10 microns with a gap variability of less than 3 microns over the face of workpiece 108 can be achieved with system 100. Another advantage is that system 100 uses a vacuum force instead of some sort of mechanical clamp to hold workpiece 108 against workpiece surface 106. Such an approach not only enables system 100 to be used with smaller machining gaps but also increases the amount workpiece 108 surface area available for machining.

The invention has been described above with reference to specific embodiments. Persons skilled in the art, however, will understand that various modifications and changes may be made thereto without departing from the broader spirit and scope of the invention as set forth in the appended claims. For example, in one embodiment, workpiece 108 may be loaded into system 100 automatically. In an alternative embodiment, workpiece 108 may be loaded into system 108 manually. Similarly, in one embodiment, workpiece 108 may be decoupled from ejector pin 111 and removed from system 100 automatically. In an alternative embodiment, workpiece 108 may be decoupled from ejector pin 111 and removed from system 100 manually. The foregoing description and drawings are, accordingly, to be regarded in an illustrative rather than a restrictive sense.

What is claimed is:

1. A system for holding and releasing a workpiece for electrochemical machining, the system comprising: a workpiece holder having a workpiece surface configured to couple to the workpiece in response to a negative pressure being applied to a vacuum reservoir to provide a seal between the workpiece and the workpiece surface; the vacuum reservoir disposed within the workpiece holder having a proximal end capable of being removably coupled to the workpiece; and a piston configured to move upward in the vacuum reservoir towards the workpiece and to lift the workpiece off of the workpiece surface in response to a positive pressure being applied to the system, further comprising an electrode disposed above the workpiece by a machining gap, the electrode having a pattern and configured to provide a conductive electrolyte to the machining gap such that the pattern is imposed on the workpiece.

2. The system of claim 1, further comprising a radial locator capable of being removably coupled to the workpiece holder and configured to radially locate the workpiece on the workpiece surface.

3. The system of claim 1, wherein the workpiece surface is further configured to provide an anodic contact and to resist anodic corrosion.

4. The system of claim 3, wherein the workpiece surface comprises titanium.

5. The system of claim 1, wherein the workpiece surface has a finish with a roughness average of 0.05 to 0.1 microns.

6. The system of claim 1, further comprising a base having a locating surface and configured to support the workpiece holder.

7. The system of claim 6, wherein the degree of parallelism between the workpiece surface and the locating surface is 1 micron.

8. The system of claim 1, wherein the piston includes a base portion and an ejector pin, the ejector pin configured to lift the workpiece off of the workpiece surface.

9. The system of claim 8, wherein the ejector pin includes a magnet capable of removably coupling the workpiece to the ejector pin.

10. The system of claim 1, wherein the piston includes air passages configured to provide a flow path between the proximal end of the vacuum reservoir and a vacuum port.

11. The system of claim 10, wherein the piston includes an O-ring configured to provide a seal between the air passages and the proximal end of the vacuum reservoir in response to the positive pressure being applied to the system.

12. A method for holding and releasing a workpiece for electrochemical machining, the method comprising: applying a negative pressure to a vacuum reservoir to produce an air flow through the vacuum reservoir: loading the workpiece onto a workpiece surface to couple the workpiece to a proximal end of the vacuum reservoir; forming a seal between the workpiece and the workpiece surface to produce a pressure drop across the workpiece; applying a positive pressure to the vacuum reservoir; and lifting the workpiece off of the workpiece surface by a piston configured to move upward in the vacuum reservoir, further comprising the step of providing a conductive electrolyte to a machining gap to impose a pattern on the workpiece.

13. The method of claim 12, wherein a piston that is configured to move upward within the vacuum reservoir in response to the application of the positive pressure lifts the workpiece.

14. The method of claim 12, further comprising the step of coupling the workpiece to an ejector pin.

15. The method of claim 12, wherein the workpiece surface is configured to provide an anodic contact and to resist anodic corrosion.

* * * * *